US009151961B2

(12) United States Patent
Iwamoto et al.

(10) Patent No.: US 9,151,961 B2
(45) Date of Patent: Oct. 6, 2015

(54) OPTICAL COMPONENT

(71) Applicants: Sumitomo Electric Hardmetal Corp., Itami (JP); Sumitomo Electric Industries, Ltd., Osaka (JP)

(72) Inventors: Hiromi Iwamoto, Osaka (JP); Kunimitsu Yajima, Itami (JP)

(73) Assignees: Sumitomo Electric Hardmetal Corp., Itami-shi (JP); Sumitomo Electric Industries, Ltd., Osaka-shi (JP)

( * ) Notice: Subject to any disclaimer, the term of this patent is extended or adjusted under 35 U.S.C. 154(b) by 139 days.

(21) Appl. No.: 14/079,499

(22) Filed: Nov. 13, 2013

(65) Prior Publication Data
US 2014/0133013 A1 May 15, 2014

(30) Foreign Application Priority Data
Nov. 13, 2012 (JP) ................... 2012-249375

(51) Int. Cl.
*G02B 5/30* (2006.01)
*G02B 27/28* (2006.01)

(52) U.S. Cl.
CPC ............ *G02B 27/286* (2013.01); *G02B 5/3083* (2013.01)

(58) Field of Classification Search
CPC ...... G02B 27/28; G02B 27/286; G02B 5/208; G02B 5/3066; G02B 2307/42; H01S 3/0064; H01S 5/005; H01S 5/18302; H01L 31/00
USPC .................. 359/352, 485.01, 485.02, 485.03, 359/489.07, 580; 250/225, 341.3
See application file for complete search history.

(56) References Cited

U.S. PATENT DOCUMENTS

| | | | | |
|---|---|---|---|---|
| 3,998,524 A * | 12/1976 | Hubby et al. | ............ | 359/489.09 |
| 4,536,063 A | 8/1985 | Southwell | | |
| 6,396,630 B1 * | 5/2002 | Stiens et al. | ............. | 359/489.07 |
| 6,977,774 B1 * | 12/2005 | Kawakami et al. | ...... | 359/485.03 |

* cited by examiner

*Primary Examiner* — Scott J Sugarman
*Assistant Examiner* — Collin X Beatty
(74) *Attorney, Agent, or Firm* — Venable LLP; Michael A. Sartori; Tamatane J. Aga

(57) ABSTRACT

An optical component including: a first substrate body which is made of a platy member allowing infrared laser beam to be transmitted therethrough and having a refractive index of 2 to 4 with respect to the infrared laser beam, and which has an input surface where the infrared laser beam is incident, and an inclined surface inclined to the input surface at an angle of inclination, calculated in accordance with Formula (I):

$$n(\lambda) \times \sin \theta(\lambda) = 1 \times \sin(x) \quad (I)$$

and formed with a transmitting phase retarding film that shifts a phase of the infrared laser beam; and a second substrate body which is made of the platy member and which has an output surface from which the infrared laser beam is emitted, and an inclined surface inclined at the angle of inclination to the output surface and formed with the transmitting phase retarding film. The inclined surfaces of both substrate bodies are arranged as opposed to each other so as to have a space therebetween.

6 Claims, 12 Drawing Sheets

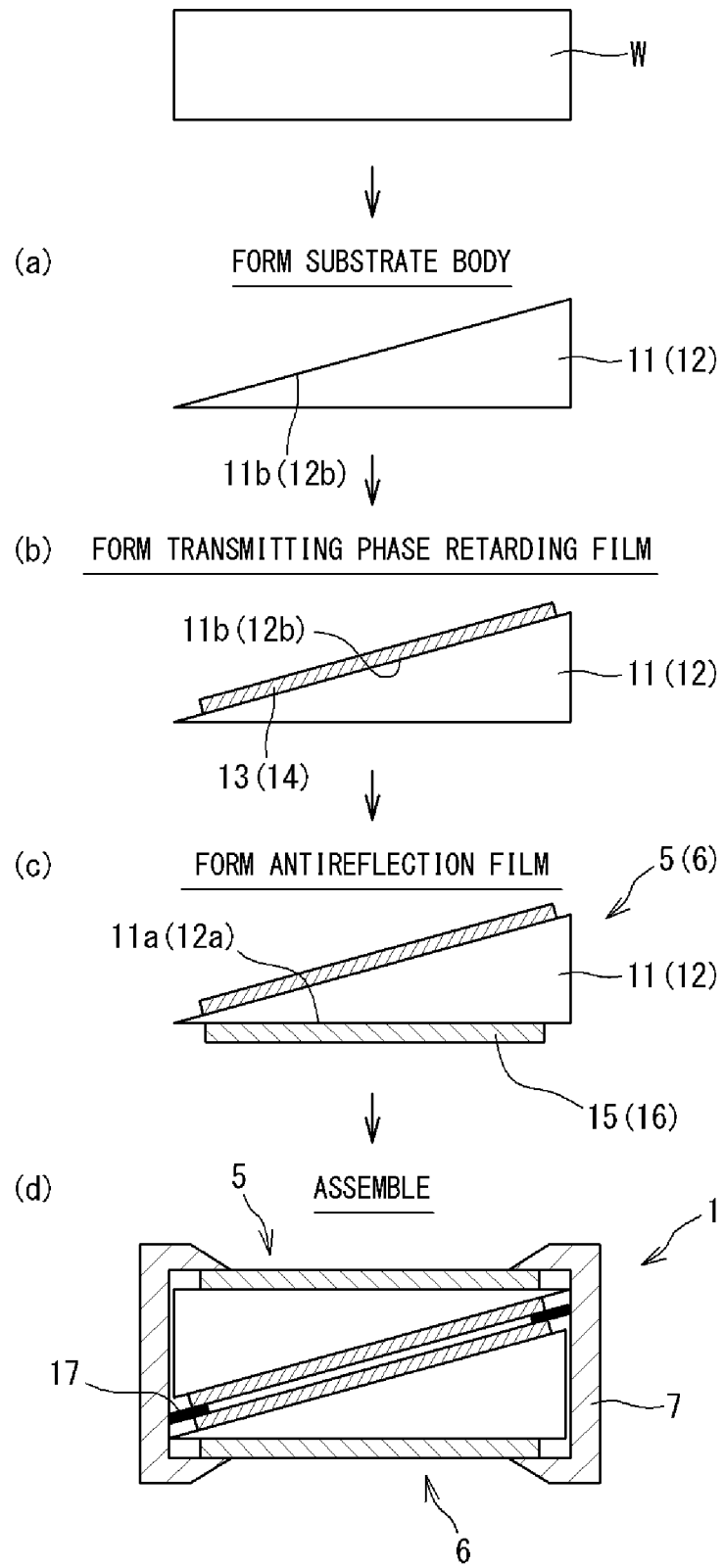

OPTICAL COMPONENT

TECHNICAL FIELD

The present invention relates to an optical component, and especially relates to an optical component for infrared laser beam which is useful for converting a polarization of infrared laser beam to an appropriate state for processing an object.

BACKGROUND ART

Laser processing which uses infrared laser beam such as carbon dioxide laser beam (hereinafter referred to as "infrared laser processing") has been applied to processing of an object such as a metal material, e.g., fine drilling, cutting and welding. In the case of cutting the object by such infrared laser processing, there may occur a problem in terms of processing quality due, for example, to a difference in a cutting width or a cutting plane quality depending on a polarization direction of laser beam. For this reason, in a laser processing machine for use in the infrared laser processing, a circular polarization mirror as a reflective-type optical component is provided for the purpose of eliminating an influence on the processing quality exerted by the polarization direction of the infrared laser beam, thereby to convert a polarization of the infrared laser beam from linear polarization to circular polarization which has no dependency on the processing direction.

However, the laser processing machine provided with the reflective optical component is required to have a large space for returning of laser beam as well as a complicated folded optical system in order to convert laser beam into a desired polarization, which leads to an increased size of the machine and an increased number of components, and hence the machine has disadvantages of low mass productivity, high cost and low industrial productivity.

Thus, from the viewpoint of making the machine compact and reducing the number of components, there have, for example, been proposed transmission-type optical components which are: an infrared wave plate allowing light in a visible region to a far-infrared region to be transmitted therethrough and using a crystal such as cadmium sulfide that is a low-absorption uniaxial crystalline; and a transmission-type phase retardation substrate made of a transparent substrate formed with transparent multilayers (e.g., see Patent Literature 1).

However, the above infrared wave plate has its limit on an element aperture permitted for the uniaxial crystal and low permitted intensity of laser beam, and hence the infrared wave plate has a disadvantage of having limited applicability.

Further, in the phase retardation substrate described in Patent Literature 1, since optical axis displacement of a transmission beam occurs in accordance with the thickness of the transparent substrate, a component for correcting the optical axis displacement, or the like, is further required in addition to the phase retardation substrate, and furthermore, adjustment of the optical axis is difficult.

There has then been proposed a transmission-type phase retardation substrate (e.g., see Patent Literature 2) or the like, made up of a pair of substrate bodies. The substrate body is made of a platy member that allows infrared light to be transmitted therethrough, one surface of which is formed with a fine structure of periodically repeating a roof-like structure in a cross-sectionally triangular shape or a roof-like structure in a cross-sectionally trapezoidal shape and provided with a phase retardation substrate, and the other surface of which is made a smooth surface. The surfaces of the substrate bodies, which are formed with the fine structures, are joined for integration.

CITATION LIST

Patent Literature

Patent Literature 1: U.S. Pat. No. 4,536,063
Patent Literature 2: U.S. Pat. No. 6,396,630

SUMMARY OF INVENTION

Technical Problem

However, the phase retardation substrate described in Patent Literature 2 has a disadvantage of the difficulty in press-abutting such substrate bodies to each other at the time of manufacturing the phase retardation substrate in terms of the vulnerability of the substrate bodies, and also has a disadvantage of the possibility in heat generation due to absorption of laser beam into an adherent for optical use in the case of pasting the substrates to each other with the adherent for optical use.

In view of the conventional problems as thus described, it is an objective of the present invention to provide an optical component which can convert a polarization to a desired one in a small space without performing a complicated adjustment on an optical axis, and has a simple structure.

Solution to Problem

An optical component of the present invention is an optical component which allows infrared laser beam to be transmitted therethrough to convert a polarization of the infrared laser beam, the component including: a first substrate body which is made of a platy member allowing infrared laser beam to be transmitted therethrough and having a refractive index of 2 to 4 with respect to the infrared laser beam, and which has an input surface where the infrared laser beam is incident and an inclined surface inclined at a predetermined angle of inclination to the input surface; a second substrate body which is made of the platy member and which has an output surface from which the infrared laser beam is emitted and an inclined surface inclined at the predetermined angle of inclination to the output surface; a transmitting phase retarding film which is formed on each of the first and second substrate bodies, and shifts a phase of the infrared laser beam; and an antireflection film which is formed on each of the input surface and the output surface, and prevents reflection of orthogonally incident infrared laser beam, wherein the angle of inclination is the same angle as an angle of refraction $\theta(\lambda)$ of the infrared laser beam in the substrate body which is calculated in accordance with Formula (I):

$$n(\lambda) \times \sin\theta(\lambda) = 1 \times \sin(x) \qquad (I)$$

(where $\lambda$ indicates a wavelength of the infrared laser beam, $n(\lambda)$ indicates a refractive index of the platy member with respect to the infrared laser beam, and x indicates an angle of incidence of the infrared laser beam), and wherein an arrangement is made such that the transmitting phase retarding films formed on the inclined surfaces of the respective first and second substrate bodies are opposed to each other through a space, and the input surface and the output surface are parallel to each other.

According to the optical component adopted with the above configuration, the transmitting phase retarding films formed on the inclined surfaces are opposed to each other through the space and the input surface and the output surface are parallel to each other, whereby the infrared laser beam is made orthogonally incident and a phase retardation is generated, to allow conversion of the infrared laser beam to one in a desired polarization, and further allow suppression of beam displacement of the infrared laser beam. Further, in the optical component applied with the above structure, even in the case of occurrence of slight transmittance displacement in the transmitting phase retarding film, generated weak reflected light is reflected in the space between the transmitting phase retarding films formed on both inclined surfaces and then dissipated to the outer periphery, and hence a tolerance to a manufacturing error is high. Moreover, in the optical component applied with the above structure, absorption coefficients in the infrared region of the platy member constituting the substrate body and a material constituting an infrared optical multilayer film formed on the surface of the substrate body are extremely low, and hence the component can be used to convert a polarization of high-power infrared laser beam. Furthermore, both the input surface and the output surface are formed with the antireflection film for preventing reflection of the orthogonally incident infrared laser beam. Therefore, according to the optical component applied with the above structure, it is possible to prevent reflection of the orthogonally incident infrared laser beam on the input surface of the substrate body, so as to allow the infrared laser beam to be efficiently transmitted through the optical component and to suppress a loss of the infrared laser beam.

The peripheral edge of the inclined surface of each of the first and second substrate bodies is preferably provided with a spacer made of a material with good thermal conductivity and serving to hold the space. According to the optical component adopted with the above configuration, heat generated in the optical component associated with transmission of the infrared laser beam can be dissipated to the outside through the spacer, and hence the optical component can be quickly cooled. Further, in the optical component adopted with the above configuration, since the space can be brought into the state of being isolated from the external environment, the space can be held in a highly clear state, and the surface of the transmitting phase retarding film formed on the inclined surface tends not to be affected by the use environment. Accordingly, the optical quality of the optical component adopted with the above configuration can be held favorable over a long period of time, and the component is thus expected to have a long life.

The angle of incidence of the infrared laser beam is preferably 40° to 60° although it varies depending on the material quality of the platy member constituting the substrate body of the optical component, and on the size of the substrate body. This angle of incidence is deeply related to a refractive index of the infrared wavelength used in the substrate body, and varies depending on the angle of inclination (angle of refraction of the substrate body), but for reducing an optical path length of the infrared laser beam that is transmitted through the substrate body to lower an absorption loss, the angle of incidence is preferably set in the above range.

A phase shift A by the transmitting phase retarding film formed on the inclined surface of the first substrate body and a phase shift B by the transmitting phase retarding film formed on the inclined surface of the second substrate body may each be one half of a total phase shift by the optical component. In the optical component adopted with the above configuration, identical transmitting phase retarding films may be formed on identical substrate bodies, and there is no need for separately forming different transmitting phase retarding films at the time of manufacturing the optical component, thus leading to excellent industrial productivity.

Further, the phase shift A and the phase shift B may be different from each other, and a sum of the phase shift A and the phase shift B may be the total phase shift by the optical component. The optical component adopted with the above configuration has a manufacturing advantage of being able to manufacture an optical component corresponding to a variety of phase shifts.

The first and second substrate bodies may be periodically provided with a pair of inclined surfaces whose base angle is the angle of inclination and which forms a cross-sectionally isosceles triangular projecting shape. According to the optical component adopted with the above configuration, since the first and second substrate bodies can be made thin, the optical component can be made more compact in the optical path length of the infrared laser beam.

Advantageous Effects of Invention

The optical component of the present invention can convert a polarization to a desired one in a small space without performing a complicated adjustment on an optical axis, and has a simple structure.

BRIEF DESCRIPTION OF DRAWINGS

FIG. 1 is a cross-sectional explanatory view showing an optical component according to one embodiment (first embodiment) of the present invention.

FIG. 2 is a cross-sectional explanatory view showing substrate elements of the optical component according to first embodiment of the present invention.

FIG. 3 is a schematic explanatory view showing an optical path of infrared laser beam that is transmitted through the substrate element of the optical component according to first embodiment of the present invention.

FIG. 4 is a partially expanded explanatory view showing the substrate element of the optical component according to first embodiment of the present invention.

FIG. 5 is a partially expanded explanatory view showing the vicinity of a space in the optical component according to first embodiment of the present invention.

FIG. 6A is a principal-part cross-sectional explanatory view showing substrate elements of an optical component according to second embodiment of the present invention, and FIG. 6B is a partial explanatory view showing a substrate body of the substrate element.

[FIG. 7] FIG. 7 is a process view of a manufacturing method for the optical component according to first embodiment of the present invention, depicting parts (a), (b), (c), and (d) of the manufacturing method.

FIG. 8 is a graph showing the relation between a wavelength of the infrared laser beam and a transmittance.

FIG. 9 is a graph showing the relation between the wavelength of the infrared laser beam and a phase shift.

FIG. 10 is a graph showing the relation between an angle of incidence of the infrared laser beam and the transmittance.

FIG. 11 is a graph showing the relation between the angle of incidence of the infrared laser beam and the phase shift.

FIG. 12 is a graph showing the relation between the angle of inclination of an inclined surface of the substrate body and the angle of incidence (angle of emergence) in the space G.

DESCRIPTION OF EMBODIMENTS

Optical Component According to First Embodiment

Figure 1:
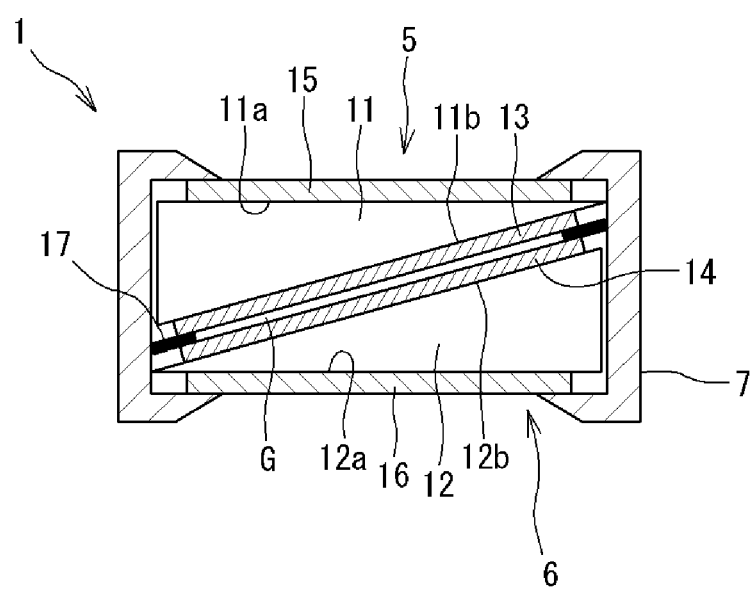
[FIG. 1]

Hereinafter, embodiments of an optical component of the present invention will be described in detail with reference to the attached drawings. In the drawings below, a transmitting phase retarding film, an antireflection film and a spacer which constitute the optical component are drawn with appropriately exaggerated sizes for the sake of clear explanations thereof.

It is to be noted that, since a typical phase shift used in converting linear polarization to circular polarization is λ/4 (90°) in processing by use of infrared laser beam, an optical component with its phase shift set to λ/4 is exemplified hereinafter, but the present invention is not limited to such exemplification. Further, an angle of emergence and an angle of incidence of the infrared laser beam on an inclined surface formed with the transmitting phase retarding film constituting the optical component are each set to 45°.

Figure 2:
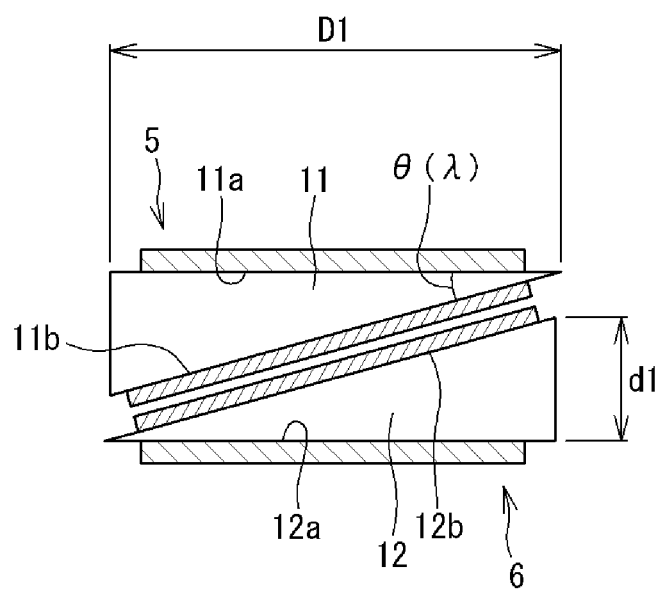
[FIG. 2]

FIG. 1 is a cross-sectional explanatory view showing an optical component according to one embodiment (first embodiment) of the present invention, and FIG. 2 is a cross-sectional explanatory view showing substrate elements of the optical component according to first embodiment of the present invention.

An optical component 1 shown in FIG. 1 is provided with a pair of substrate elements 5, 6 and a holder 7. In such an optical component 1, the substrate elements 5, 6 are identical substrate elements and respectively have the same phase shift. Hence it is set that the phase shift of each of the pair of substrate elements 5, 6 is λ/8, and the phase shift as a whole is λ/4(90°) by combination of the substrate elements 5, 6. Since the substrate elements 5, 6 are identical ones as thus described and there is no need for separately manufacturing different substrate elements in manufacturing the optical component 1, the optical component 1 according to the present first embodiment is excellent in industrial productivity.

The substrate element 5 comprises a substrate body 11, a transmitting phase retarding film 13 for shifting a phase of infrared laser beam, and an antireflection film 15 for preventing reflection of orthogonally incident infrared laser beam. Further, the substrate element 6 comprises a substrate body 12, a transmitting phase retarding film 14 for shifting a phase of infrared laser beam, and an antireflection film 16 for preventing reflection of orthogonally incident infrared laser beam.

In the present specification, for convenience' sake, one that is arranged on the infrared laser beam incident side is taken as the substrate element 5 and one arranged on the infrared laser beam emitting side is taken as the substrate element 6.

The substrate body 11 has an input surface 11a on which the infrared laser beam is incident, and an inclined surface 11b inclined at a predetermined angle of inclination θ(λ) to the input surface 11a. The substrate body 12 has an output surface 12a from which the infrared laser beam is emitted, and an inclined surface 12b inclined at the predetermined angle of inclination θ(λ) to the output surface 12a (cf. FIGS. 1 and 2). Each of the substrate bodies 11, 12 is made of a platy member allowing the infrared laser beam to be transmitted therethrough and having a refractive index of 2 to 4 with respect to the infrared laser beam, and has a cross-sectionally triangular shape. In the present first embodiment, the substrate bodies 11, 12 are formed in a disk shape.

Figure 3:
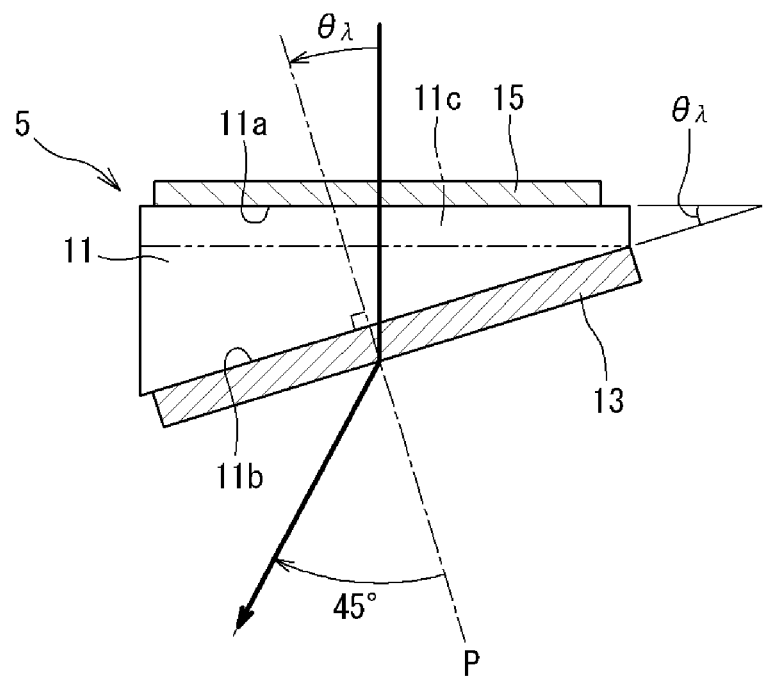
[FIG. 3]

It is to be noted that in the present invention, each of the substrate bodies 11, 12 may have a base in a short columnar shape as shown in FIG. 3 from the viewpoints of facilitating manufacturing of the optical component and improving the strength of the optical component.

In the optical component according to the present first embodiment, zinc selenide is used as a material constituting the substrate.

It should be noted that in the present invention, the material constituting the substrate may only be a material which allows the infrared laser beam to be transmitted therethrough and has a refractive index of 2 to 4 with respect to the infrared laser beam. Examples of the material constituting the substrate may include zinc sulfide, zinc selenide, silicon and germanium, but the present invention is not limited to such examples. In the present invention, among these materials, zinc selenide is preferably used and chemical vapor deposition zinc selenide is more preferably used since the material is required to have an extremely low absorption coefficient in a high-power infrared laser.

As shown in FIG. 3, in each of the substrate bodies 11, 12, the angle of inclination of the inclined surface is the same angle as an angle of refraction θ(λ) of the infrared laser beam in each of the substrate bodies 11, 12, which is calculated in accordance with Formula (I):

$$n(\lambda) \times \sin \theta(\lambda) = 1 \times \sin(x) \quad (I)$$

(where λ indicates a wavelength of the infrared laser beam, n(λ) indicates a refractive index of the substrate with respect to the infrared laser beam, and x indicates an angle of incidence of the infrared laser beam).

Here, in Formula (I), λ is a wavelength of the infrared laser beam as an object whose polarization is to be converted. Examples of the infrared laser beam may include carbon dioxide laser beam, but the present invention is not limited to such an example. The wavelength of the infrared laser beam is normally 1000 to 12000 nm in general. Among the above infrared laser beam, a wavelength of the carbon dioxide laser beam is normally from 9300 nm to 10600 nm.

Further in Formula (I), n(λ) is the refractive index of the substrate with respect to the infrared laser beam. Although the refractive index n(λ) is set to 2.40 to 2.41 in the present first embodiment, such a refractive index n(λ) normally depends on the material constituting the substrate in the present invention.

Further, in Formula (I), x indicates the angle of incidence of the infrared laser beam. The angle of incidence of the infrared laser beam is set to 45° as described above in the present first embodiment, but in the present invention, it can be appropriately set so as to be an angle of incidence within the range of ensuring the thickness and the strength of each of the substrate bodies 11, 12 which are permitted in manufacturing thereof.

Normally, the angle of incidence is preferably 40° to 60° and more preferably 40° to 50° from the viewpoints of reducing the number of undermentioned optical layers which constitute the transmitting phase retarding film 13, and reducing the maximum thickness of each of the substrate elements 5, 6 to make the optical component 1 more compact.

It is to be noted that the foregoing range of the angle of incidence varies depending on the material quality and the size of each of the substrate elements 5, 6. For example, with an undermentioned general size, when the material quality of each of the substrate elements 5, 6 is zinc selenide, the angle of incidence is preferably 40° to 50°. As opposed to this, when the material quality of each of the substrate elements 5, 6 is germanium, the angle of incidence is preferably 40° to 60°. The refractive index of germanium in the wavelength region of the infrared laser beam (1000 to 12000 nm) is about 4.0, which is larger than in the case where the material quality of each of the substrate elements 5, 6 is zinc selenide, whereby the angle of inclination $\theta(\lambda)$ calculated by substituting 45° for x and 4.0 for $n(\lambda)$ in above Formula (I) is about 10°. Thus, even when the angle of inclination is made smaller, a similar effect can be obtained with the substrate element having a smaller thickness than in the case of the material quality of each of the substrate elements 5, 6 being zinc selenide. Accordingly, the component is expected to be made further compact.

In the present first embodiment, a diameter of each of the substrate bodies 11, 12 can be set as appropriate in accordance with the use of the optical component 1, or the like. Such a diameter of each of the substrate bodies 11, 12 is applied with a diameter in a range of 38.1 to 63.5 mm in a normal laser optical component, although it may depend on a laser beam diameter.

Further, a thickness of each of the substrate bodies 11, 12 can be set as appropriate in accordance with the diameter of each of the substrate bodies 11, 12, the wavelength of the infrared laser beam used, and the like. It is to be noted that in the present specification, the thickness of each of the substrate bodies 11, 12 can be calculated in accordance with Formula (II):

thickness $d1$ of substrate bodies 11,12=diameter $D1$ of substrate bodies 11,12×tan $\theta(\lambda)$     (II)

(cf. FIG. 2).

In the present first embodiment, for example when the diameter of each of the substrate bodies 11, 12 is 38.1 mm or 50.8 mm and the wavelength λ of the infrared laser beam used is 9300 nm or 10600 nm, the refractive index $n(\lambda)$ and the angle of inclination $\theta(\lambda)$ of the substrate and the thickness of each of the substrate bodies 11, 12 are values respectively shown in Table 1.

TABLE 1

| Wavelength λ [nm] | | 9300 | 10600 |
|---|---|---|---|
| Refractive index $n(\lambda)$ | | 2.4105 | 2.403 |
| Angle of inclination $\theta(\lambda)$ [°] | | 17.0585 | 17.1132 |
| Thickness (mm) of substrate bodies 11, 12 | When diameter D of substrate bodies 11, 12 = 38.1 mm | 11.691 | 11.731 |
| | When diameter D of substrate bodies 11, 12 = 50.8 mm | 15.588 | 15.641 |

As thus described, according to the optical component 1, the angle of inclination of the inclined surface where the transmitting phase retarding film is formed is $\theta(\lambda)$ which satisfies Formula (I), and hence it is possible to generate a phase retardation and convert the infrared laser beam into a desired polarization, and further to suppress beam displacement of the infrared laser beam whose polarization has been converted.

The transmitting phase retarding film 13 is formed on the inclined surface 11*b* and the transmitting phase retarding film 14 is formed on the inclined surface 12*b*.

Figure 4:
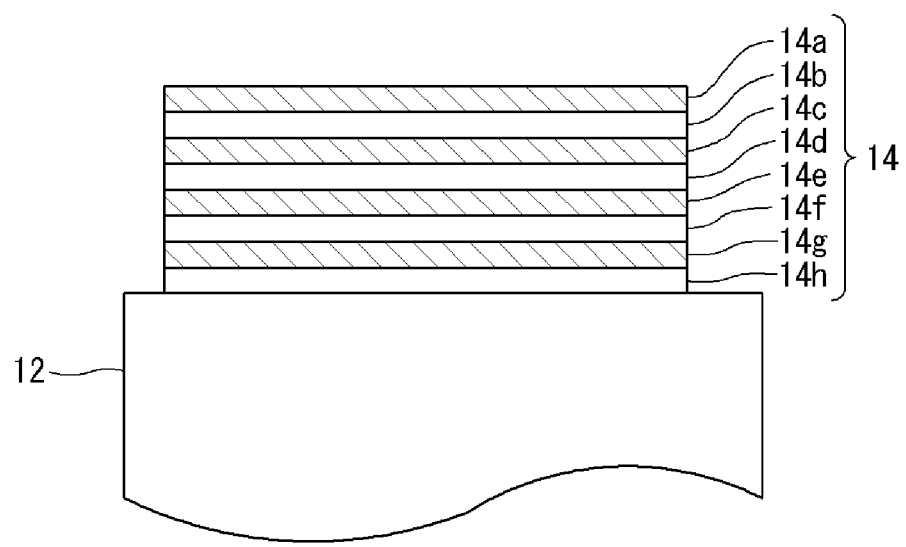
[FIG. 4]

In the present first embodiment, when the wavelength of the infrared laser beam used is 10600 nm, as shown in FIG. 4 and Table 2, each of the transmitting phase retarding films 13, 14 can be a multilayer film having a multilayer structure formed by alternately stacking, on the substrate body (cf. 12 in FIG. 4): high refractive index layers (cf. 14*a*, 14*c*, 14*e*, 14*g* in FIG. 4) made of zinc selenide as a material for a high refractive index film allowing the infrared laser beam to be transmitted therethrough and having a low absorption coefficient of the infrared laser beam; and low refractive index layers (cf. 14*b*, 14*d*, 14*f*, 14*h* in FIG. 4) made of thorium fluoride as a material for a low refractive index film allowing the infrared laser beam to be transmitted therethrough and having a low absorption coefficient of the infrared laser beam.

TABLE 2

| | | FIG. 4 | Constitutional material | Optical thickness [unit: λ/4] | Layer thickness [nm] |
|---|---|---|---|---|---|
| Air medium | | — | — | — | — |
| Transmitting phase retarding film | First layer | 14a | Zinc selenide | 0.5014 | 553 |
| | Second layer | 14b | Thorium fluoride | 0.7644 | 1501 |
| | Third layer | 14c | Zinc selenide | 0.7678 | 847 |
| | Fourth layer | 14d | Thorium fluoride | 0.9017 | 1770 |
| | Fifth layer | 14e | Zinc selenide | 0.7991 | 881 |
| | Sixth layer | 14f | Thorium fluoride | 0.8155 | 1601 |
| | Seventh layer | 14g | Zinc selenide | 0.6405 | 706 |
| | Eighth layer | 14h | Thorium fluoride | 0.6680 | 1311 |
| Substrate body | | 12 | Zinc selenide | — | — |

It should be noted that in the present invention, the transmitting phase retarding films 13, 14 may only be made of a material which allows the infrared laser beam to be transmitted therethrough and has a low absorption coefficient of the infrared laser beam. In the present invention, from the viewpoint of making the optical component 1 compact, each of the transmitting phase retarding films 13, 14 is preferably a multilayer film configured of the high refractive index layers made of the material for the high refractive index film, and the low refractive index layers made of the material for the low refractive index film. The material for the high refractive index film includes, for example, germanium, zinc sulfide, zinc telluride and lead telluride in addition to zinc selenide described above, but the present invention is not limited to such examples. Further, the material for the low refractive index film includes, for example, other fluoride, a mixture thereof, solid solutions generated by mixing in an appropriate weight ratio and melting, alkaline earth metal fluoride, rare earth metal fluoride or the like, but the present invention is not limited to such examples. The fluoride includes, for example, thorium fluoride described above, barium fluoride, yttrium fluoride, ytterbium fluoride, aluminum fluoride, samarium fluoride, praseodymium fluoride, and the like, but the present invention is not limited to such examples. The solid solution includes, for example, IRX (product name, manufactured by Materion, Inc.) or the like, but the present invention is not limited to such an example.

Such transmitting phase retarding films 13, 14 can be designed in accordance with, for example, an optical thin film theory described in Reference Literature: "Thin Film Optical Filters, 2nd edition", written by H. A. Macleod, published in 1986.

Here, in the transmitting phase retarding films 13, 14 having the foregoing multilayer structure as in the present first embodiment, due to the isotropy of the films, an optical path of p-polarization and an optical path of s-polarization are the same in accordance with the Snell's law.

On the other hand, an effective refractive index of a p-polarization component in a layer medium i (material constituting a layer) is a value obtained in accordance with Formula (III):

$$n(\lambda)^p i = n(\lambda) i / \cos \theta(\lambda) i \quad \text{(III)}$$

(where $n(\lambda)$ and $\theta(\lambda)$ are as similar to the above). An effective refractive index of an s-polarization component in the layer medium i (material constituting the layer) is a value obtained in accordance with Formula (IV):

$$n(\lambda)^s i = n(\lambda) i \times \cos \theta(\lambda) i \quad \text{(IV),}$$

where $n(\lambda)$ and $\theta(\lambda)$ are similar to the above). The above obtained values are different from each other.

Accordingly, in each of the transmitting phase retarding films 13, 14 having the above multilayer structure as in the present first embodiment, optical lengths of the p-polarization component and the s-polarization component are different from each other, leading to occurrence of phase retardations of the p-polarization and the s-polarization.

Further a physical thickness of each layer constituting each of the transmitting phase retarding films 13, 14 having the multilayer structure as in the present first embodiment can be calculated using optical thin-film calculation software, by performing optimization computing which makes the phase shift a desired value. Moreover, for simultaneously satisfying a desired phase shift and a desired transmittance, these desired phase shift and desired transmittance may be respectively set to target values and then the optimization computing may be performed using the optical thin-film calculation software.

The antireflection film 15 is formed on the input surface 11a, and the antireflection film 16 is formed on the output surface 12a. In the present first embodiment, in the optical component 1, each of the antireflection films 15, 16 is configured of a first layer (thickness 230 nm) made of zinc selenide (its refractive index of infrared laser beam with wavelength of 10600 nm is 2.403) as the material for the high refractive index film, and a second layer (thickness 1046 nm) made of thorium fluoride (its refractive index of infrared laser beam with wavelength of 10600 nm is 1.35) as the material for the low refractive index film, in the order from the outer sides of the substrate bodies 11, 12. Since reflection of orthogonally incident infrared laser beam on the input surface 11a of the substrate body 11 can be prevented by the antireflection film 15, it is possible to allow the infrared laser beam to be efficiently transmitted through the optical component 1 and thus suppress a loss of the infrared laser beam.

It is to be noted that in the present invention, as for the materials constituting each of the antireflection films 15, 16, materials may be selected as appropriate and used out of the foregoing materials for the high refractive index films and materials for the low refractive index film in accordance with the wavelength of the infrared laser beam used, in place of using zinc selenide and thorium fluoride mentioned above. Further, such antireflection films 15, 16 can be designed in accordance with, for example, the optical thin film theory described in "Thin Film Optical Filters, 2nd edition", written by H. A. Macleod, published in 1986.

In the present invention, from the viewpoint of making the optical component 1 compact, each of the antireflection films 15, 16 is preferably a multilayer film configured of the high refractive index layers made of the material for the high refractive index film and the low refractive index layers made of the material for the low refractive index film.

A thickness of each of the antireflection films 15, 16 can be decided as appropriate in accordance with the wavelength of the infrared laser beam used, or the like.

Figure 5:
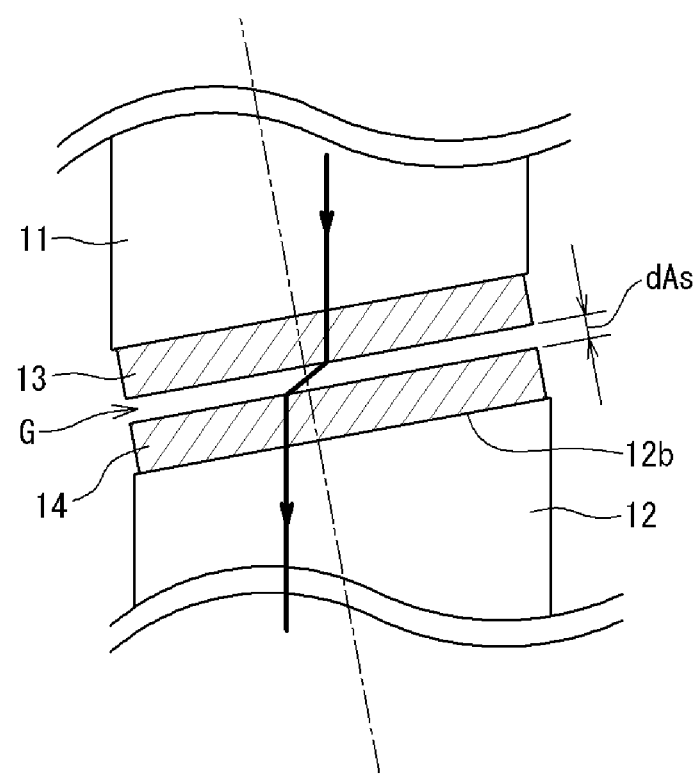
[FIG. 5]

In the optical component 1 according to the present first embodiment, the substrate elements 5, 6 are arranged such that, a space G is provided through a spacer 17 between the transmitting phase retarding film 13 formed on the inclined surface 11b of the substrate body 11 and the transmitting phase retarding film 14 formed on the inclined surface 12b of the substrate body 12 (cf. FIGS. 1 and 5).

The spacer 17 is made of a circular sheet member of a heat conductive material with favorable heat conductivity, such as a circular sheet member made of metal like aluminum or stainless, or a circular sheet member made of a non-metal inorganic material with abundant flexibility, and provided on the peripheral rims of the inclined surfaces 11b, 12b in order to hold the space G. As thus described, according to the optical component 1 of the present first embodiment, providing the space through the spacer 17 made of the heat conductive material can lead to dissipation of heat, generated in the optical component associated with transmission of the infrared laser beam, to the outside and hence the optical component can be cooled rapidly.

Further, since the spacer 17 is provided on the peripheral rims of the inclined surfaces 11b, 12b and the space G is brought into the state of being isolated from the external environment, the space G can be held in a highly clear state, and the surfaces of the transmitting phase retarding films 13, 14 formed on the inclined surface 11b, 12b tend not to be affected by the use environment. Therefore, according to the optical component 1 of the present first embodiment, the optical quality can be held favorable over a long period of time, and a long life can be expected.

It is to be noted that in the present invention, the heat conductive material may only be a material having a heat conductivity of the order of about 15 to 400 (W·m$^{-1}$·K$^{-1}$). Examples of the heat conductive material may include stainless steel and aluminum, but the present invention is not limited to such examples.

A thickness dAs of the spacer 17 (i.e., size of the space) can be set as appropriate in accordance with a permissible range of a beam displacement amount of the infrared laser beam whose polarization is converted by the optical component 1 according to the present first embodiment, or the like. The thickness dAs of the spacer 17 (i.e., size of the space) is preferably equal to or less than 1 mm and more preferably equal to or less than 0.5 mm from the viewpoint of suppressing beam displacement, and is preferably equal to or more than 0.05 mm from the viewpoints of obtaining the manufacturing easiness and handling the spacer 17.

The holder 7 is a holding member for positioning the substrate elements 5, 6 in width and diameter directions and holding them. An internal diameter of the holder 7 and a height in a width direction on the inside thereof can be set as appropriate in accordance with the diameters (maximum outer diameters) of the substrate elements 5, 6, the heights in the width direction when they are opposed to each other, or the like. Examples of the material constituting the holder 7 may include an aluminum alloy, but the present invention is not limited to such an example.

In the present first embodiment, when the infrared laser beam with a wavelength of 10600 nm is made orthogonally incident on the substrate element 5 formed on the input surface 11a from the antireflection film 15 side, as shown in FIG. 3, the infrared laser beam emitted from the transmitting phase retarding film 13 formed on the inclined surface 11b is refracted at 45° with respect to a line P vertical to the inclined surface 11b. Then, the infrared laser beam emitted from the substrate element 5 passes through the space G and is incident on the opposed inclined surface 12b of the substrate element 6 (cf. FIG. 5).

In the optical component 1 according to the present first embodiment, the transmitting phase retarding films 13, 14 formed on the inclined surfaces 11b, 12b of the substrate elements 5, 6 are opposed to each other through the space G and the input surface 11a and the output surface 12a are parallel to each other, whereby the infrared laser beam is made orthogonally incident and a phase retardation is generated, to allow conversion of the infrared laser beam to one in a desired polarization. Further, in the transmitting phase retarding film 13, even when slight beam displacement occurs, generated weak reflected light is reflected in the space G between the transmitting phase retarding films 13, 14 formed on both inclined surface and then dissipated to the outer periphery, and hence a tolerance to a manufacturing error is high.

Optical Component According to Second Embodiment

Figure 6A:
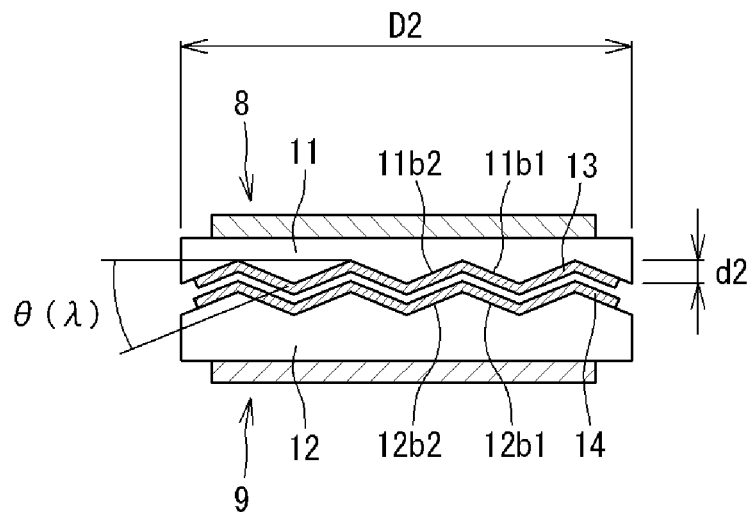
[FIG. 6A and 6B]
Figure 6B:
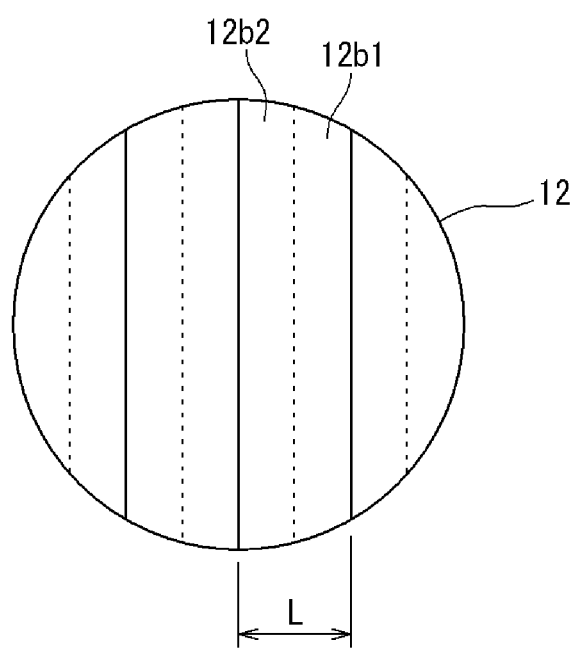

FIG. 6A is a principal-part cross-sectional explanatory view showing substrate elements of an optical component according to second embodiment of the present invention, and FIG. 6B is a partial explanatory view showing a substrate body of the substrate element.

The optical component according to the present second embodiment is different from the optical component 1 according to the present first embodiment in that, as shown in FIGS. 6A and 6B, the inclined surface 11b, 12b are respectively made up of a pair of inclined surface 11b1, 11b2 having a base angle that is the angle of incidence θ(λ) and forming a cross-sectionally isosceles triangular projecting shape which is periodically provided, and a pair of inclined surface 12b1, 12b2 forming a cross-sectionally isosceles triangular projecting shape similar to the above. It is to be noted that in FIG. 6B, a solid line indicates a valley part and a broken line indicates a mountain part in the substrate body 12.

In such an optical component according to the present second embodiment, as shown in FIGS. 6A and 6B, the substrate body 11 of the substrate element 8 and the substrate body 12 of the substrate element 9 are respectively provided with a pair of inclined surface 11b1, 11b2 having a base angle that is the angle of incidence θ(λ) and forming a cross-sectionally isosceles triangular projecting shape and a pair of inclined surface 12b1, 12b2 forming a similar cross-sectionally isosceles triangular projecting shape similar to the above, such that a period length is L (cf. FIGS. 6A and 6B)

Further, the pair of inclined surface 11b1, 11b2 and the pair of inclined surface 12b1, 12b2 are respectively formed with the transmitting phase retarding films 13, 14.

In the optical component according to the present second embodiment, a height d2 of each of the pair of inclined surface 11b1, 11b2 and the pair of inclined surface 12b1, 12b2 is expressed by Formula (V):

$$\text{height } d2 = (L/2) \times \tan θ(λ) \quad (V)$$

(where L indicates a period length and is a value smaller than a diameter D2 of each of substrate bodies 11, 12, and θ(λ) is similar to above). Therefore, assuming that the diameter D2 of each of the substrate bodies 11, 12 of the optical component according to the present second embodiment is the same as the diameter D1 of each of the substrate bodies 11, 12 according to the present first embodiment, the height d2 of each of the pair of inclined surface 11b1, 11b2 and the pair of inclined surface 12b1, 12b2 can be made smaller than the height d1 of each of the inclined surface 11b, 12b of the optical component according to the present first embodiment (cf. FIGS. 2, 6A and 6B).

In the optical component according to the present second embodiment, for example, when the period length L is set to 10, 13, 15 or 20 mm, the height d2 of each of the pair of inclined surfaces 11b1, 11b2 and the pair of inclined surfaces 12b1, 12b2 can be set as in Table 3 in accordance with Formula (V), but the present invention is not limited to such an example.

TABLE 3

| | Period length L [mm] | | | |
|---|---|---|---|---|
| | 10 | 13 | 15 | 20 |
| Height d2 [mm] | 1.534 | 1.995 | 2.301 | 3.068 |

(Optical Component According to Modified Example)

In the optical components according to the first and second embodiments described above, the substrate elements 5, 6 are identical substrate elements and the phase shifts of the respective substrate elements 5, 6 are the same and are both set to λ/8, but in the present invention, the phase shifts of the pair of substrate elements may be designed to be different from each other.

(Manufacturing Method for Optical Component)

Next, an embodiment of a manufacturing method for the optical component of the present invention will be described in more detail with reference to the attached drawings. Hereinafter, a description will be given by taking as an example a manufacturing method for the optical component 1 according to the first embodiment. FIG. 7 is a process view showing a procedure of the manufacturing method for the optical component according to first embodiment of the present invention. It should be noted that in FIG. 7, a transmitting phase retarding film, an antireflection film and a spacer which constitute the optical component are drawn with appropriately exaggerated sizes for the sake of clear explanations thereof.

First, the substrate body 11(12) having the inclined surface 11b(12b) is obtained from a disk-like member W made of a material which allows infrared laser beam to be transmitted therethrough and has a refractive index of 2 to 4 with respect to the infrared laser beam (cf. part (a) of FIG. 7). Such a substrate body 11(12) can, for example, be formed in such a manner that an intermediate material corresponding to the substrate body 11(12) is cut out of a material used for the optical component and is thereafter subjected generally to grinding, cutting, polishing and the like.

Next, the transmitting phase retarding film 13(14) is formed on the inclined surface 11b(12b) of the substrate body 11(12) (cf. part (b) of FIG. 7). The transmitting phase retarding film 13(14) can be formed by, for example, stacking each layer constituting the transmitting phase retarding film 13(14) on the surface of the inclined surface 11b(12b). Each layer constituting the transmitting phase retarding film 13(14) can be stacked on the surface of the inclined surface 11b(12b) by, for example, resistive heating evaporation, electron beam evaporation, sputtering, ion-beam deposition or the like, but the present invention is not limited by such techniques.

Next, the antireflection films 15, 16 are formed on the input surface 11a of the substrate body 11 and the output surface 12a of the substrate body 12 to obtain the substrate elements 5, 6 (cf. part (c) of FIG. 7). The antireflection films 15, 16 can be formed by stacking each layer constituting the antireflection films 15, 16 on the surface of each of the input surface 11a and the output surface 12a, or by some other method. Each layer constituting each of the antireflection films 15, 16 can be stacked on the surface of each of the input surface 11a and the output surface 12a by, for example, resistive heating evaporation, electron beam evaporation, sputtering, ion-beam deposition or the like, but the present invention is not limited by such techniques.

Subsequently, the transmitting phase retarding film 13 of the substrate element 5 is made opposed to the transmitting phase retarding film 14 of the substrate element 6 through the spacer 17 to provide the space G, and these substrate elements 5, 6 are held by the holder 7, to obtain the optical component 1 (cf. part (d) of FIG. 7).

Hereinafter, the present invention will be described in more detail by means of Examples, but the present invention is not limited to such examples.

Example 1

Optical characteristics of the transmitting phase retarding films 13, 14 shown in FIG. 4 and Table 2 were inspected. Here inspected were: the relation between the wavelength of the infrared laser beam and the transmittance of the transmitting phase retarding films 13, 14 shown in FIG. 4 and Table 2; the relation between the wavelength of the infrared laser beam and the transmitting phase shift of the transmitting phase retarding films 13, 14; the relation between the angle of incidence of the infrared laser beam and the transmittance of the transmitting phase retarding films 13, 14; and the relation between the angle of incidence of the infrared laser beam and the transmitting phase shift of the transmitting phase retarding films 13, 14.

Figure 8:
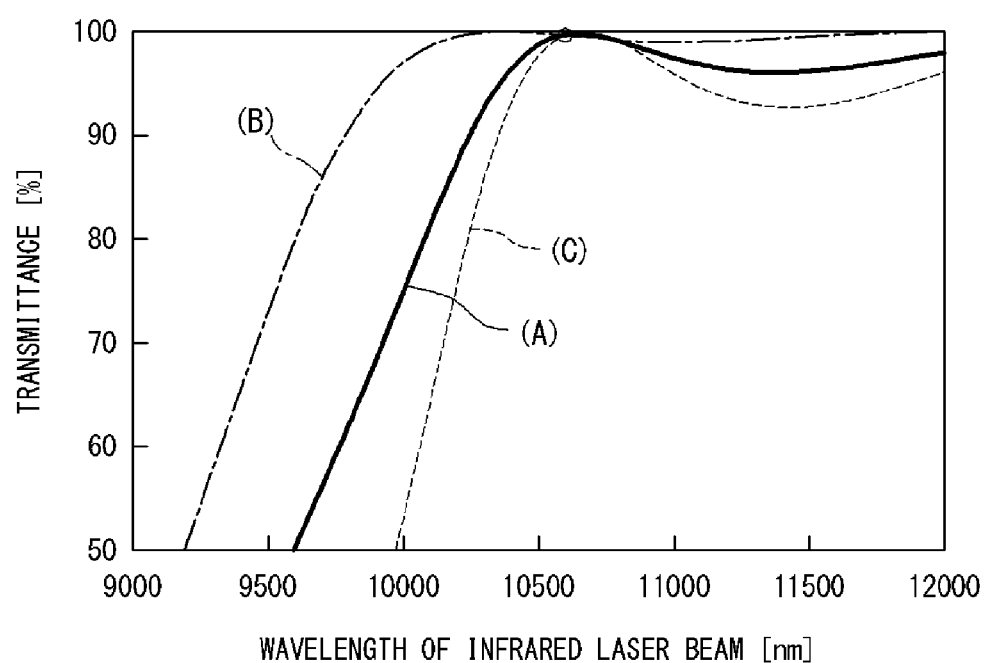
[FIG. 8]
Figure 9:
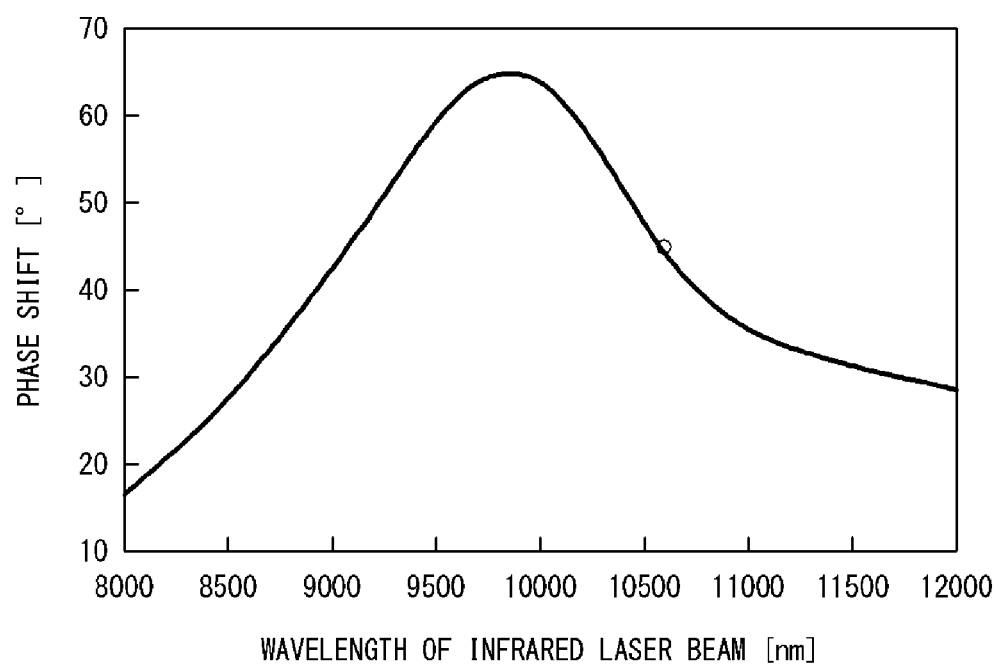
[FIG. 9]
Figure 10:
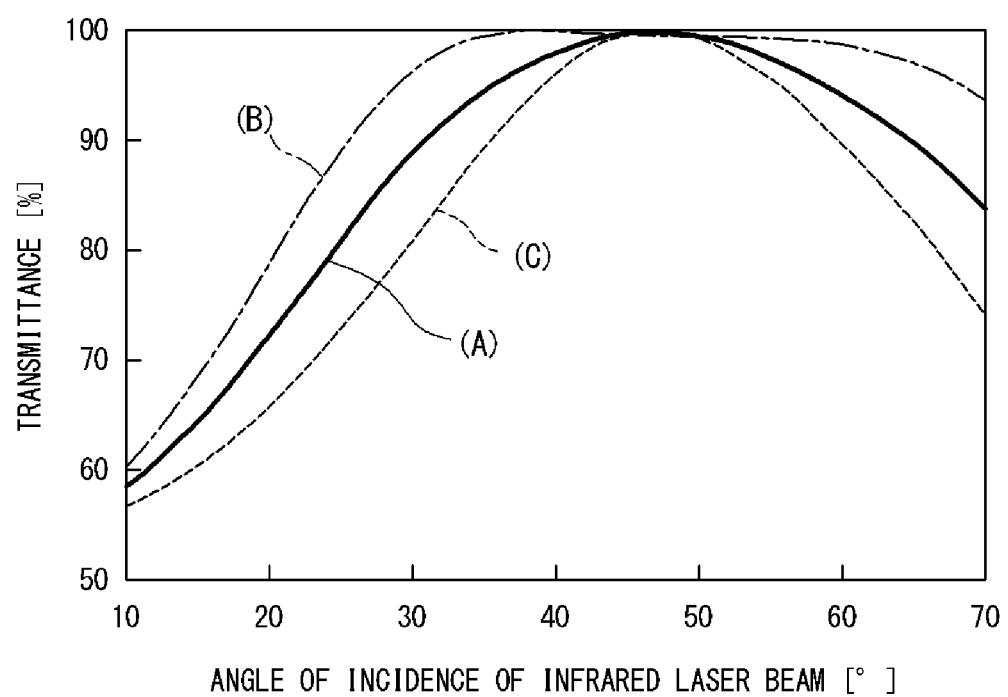
[FIG. 10]
Figure 11:
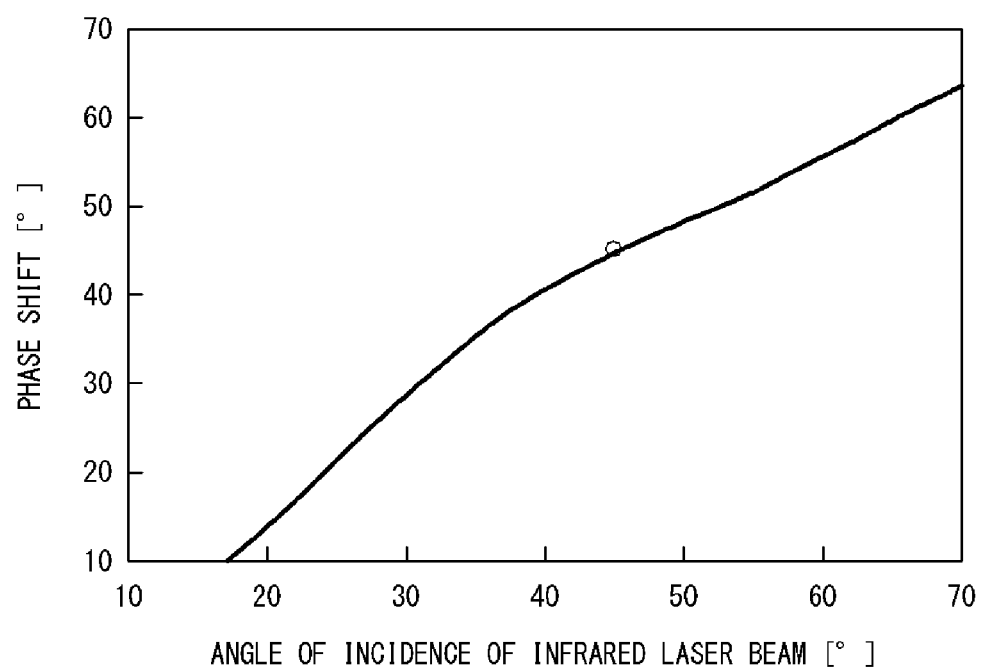
[FIG. 11]

FIG. 8 shows the relation between the wavelength of the infrared laser beam and the transmittance, FIG. 9 shows the relation between the wavelength of the infrared laser beam and the phase shift, FIG. 10 shows the relation between the angle of incidence of the infrared laser beam and the transmittance, and FIG. 11 shows the relation between the angle of incidence of the infrared laser beam and the phase shift. In FIGS. 8 and 10, (A) indicates an average value of a transmittance of the s-polarization component and a transmittance of the p-polarization component, (B) indicates the transmittance of the s-polarization component, and (C) indicates the transmittance of the p-polarization component.

It is found that, when the transmittance and the phase shift of each of the transmitting phase retarding films 13, 14 were calculated based on the results shown in FIGS. 8 and 9 at the wavelength of the infrared laser beam being in a near-field region of 10600 nm (wavelength: 10600±10 nm), the average transmittance was equal to or more than 99.6% and the phase shift was 44.4±0.4°. Further, it is found that, when the transmittance and the phase shift of each of the transmitting phase retarding films 13, 14 were calculated based on the results shown in FIGS. 10 and 11 at the wavelength of the infrared laser beam being 10600 nm and the angle of incidence being 45°±2° in the space G, the average transmittance was 99.65+1.0/−0.4% and the phase shift was 44.48±1.5°.

It is found from these results that each of the transmitting phase retarding films 13, 14 shown in FIG. 4 and Table 2 has optical characteristics shown in Table 4, and the transmittance and the transmitting phase shift thereof are sufficient values (being equal to or more than a standard transmittance of 98.0% and being a standard phase shift of 45±3°) which are required with respect to the infrared laser beam. In addition, "average" in the table indicates an average value of the transmittance of the s-polarization and the transmittance of the p-polarization.

TABLE 4

|  | Average | s-polarization | p-polarization |
|---|---|---|---|
| Transmittance (%) | 99.65 | 99.69 | 99.61 |
| Phase shift (°) |  | 44.48 |  |

Example 2

Optical characteristics of the optical component 1 made up of the substrate elements 5, 6 having the transmitting phase retarding films 13, 14 shown in FIG. 4 and Table 2 were inspected.

Since the optical component 1 has the transmitting phase retarding films 13, 14 with the phase shift of λ/8 and the antireflection films 15, 16, a trial calculation of an average transmittance of the optical component 1 can be made by a product of the transmittance of the antireflection film and the transmittance of the transmitting phase retarding film. Accordingly, when the transmittance of the antireflection film is 99.99% and the transmittance of the transmitting phase retarding film is 99.65%, $(0.9999 \times 0.9965)^2 = 0.993$ is obtained and the transmittance of the infrared laser beam in the optical component 1 is thus calculated as 99.3%.

On the other hand, the phase shift of the antireflection film is 0 since the infrared laser beam is orthogonally incident thereon, and hence the phase shift of the optical component 1 depends only on the value of the transmitting phase retarding film. Therefore, the phase shift of the optical component 1 is calculated to be 44.48+44.48=88.96°, from a sum of the phase shifts of the transmitting phase retarding films.

It was inspected as to whether the optical characteristics are greatly influenced by the relation between an error of an angle of inclination of the inclined surface which is considered as a topography manufacturing error in each of the substrate elements 5, 6 and displacement from a set value (45°) of the angle of incidence (angle of emergence) on the transmitting phase retarding film.

The relation between a fine angle change $\Delta\theta_0$ of an angle of refraction $\theta_0$ of the infrared laser beam in an air and a fine angle change $\Delta\theta\lambda$ of an angle of refraction $\theta\lambda$ in the substrate body in accordance with the Snell's law is expressed as: $\Delta\theta_0/\Delta\theta\lambda = n\lambda \cdot \cos\theta\lambda/\cos\theta_0$, and calculated to be 3.25. Then, the relation between the angle of inclination of the inclined surface of the substrate body and the angle of incidence (angle of emergence) in the space G is shown in FIG. 12.

Figure 12:
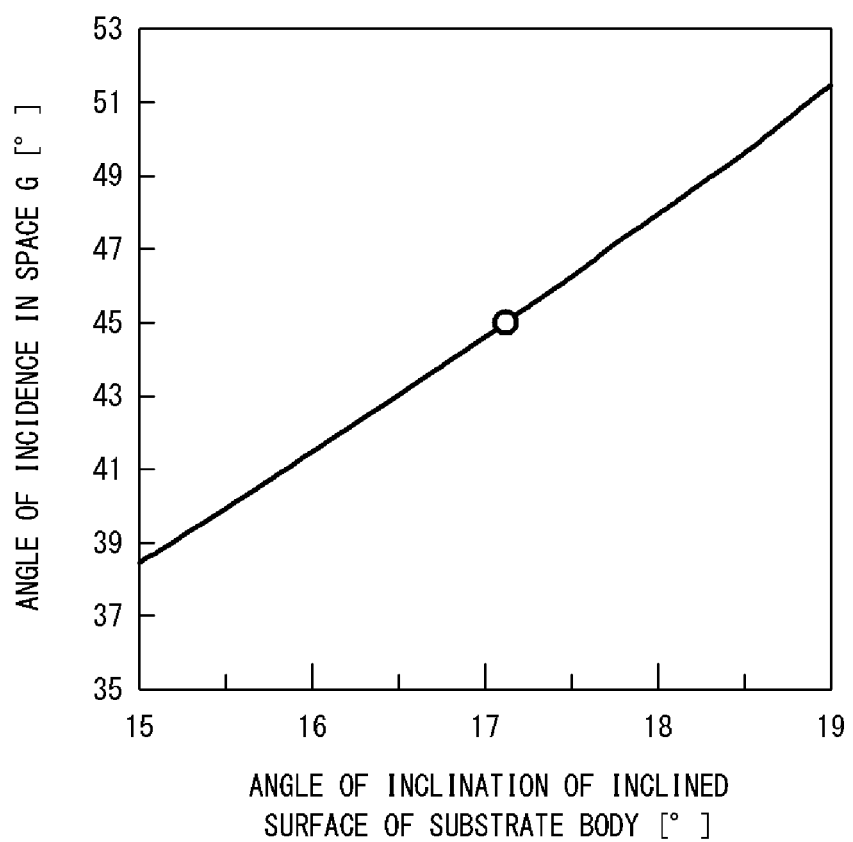
[FIG. 12]

It is found from the result shown in FIG. 12 that, in the case of a designed value of the phase shift being within ±0.5°, an optical component having sufficient optical characteristics can be obtained by, for example, setting the angle of inclination with accuracy of being within ±0.2° of a designed value of the angle of inclination when that designed value is set to 17.11°.

Example 3

In the optical component 1 according to the first embodiment, the space G as the air medium is provided between the transmitting phase retarding films. Then, as shown in FIG. 5, in a case where a size of the space G was equal to or less than 1 mm and the space G was taken as an air film with a refractive index n=1 when the infrared laser beam was emitted out of the substrate body 11 and incident into the substrate body 12, an influence on the optical characteristics due to interference in the air film was inspected.

An average transmittance, a phase shift and beam displacement were inspected in the case of setting the size of the space G to 0.05 mm, 0.1 mm, 0.5 mm or 1 mm and using the infrared laser beam with a wavelength of 10600 nm. Table 5 shows its result.

TABLE 5

|  | Width of space G [mm] | | | | Average value |
|---|---|---|---|---|---|
|  | 0.05 | 0.1 | 0.5 | 1 | |
| Average transmittance [%] | 99.0067 | 99.2623 | 99.0716 | 99.0858 | 99.1068 |
| Difference from average value of transmittances [% T] | 0.1 | 0.156 | 0.035 | 0.021 | — |
| Phase shift [°] | 88.7376 | 88.8348 | 88.8143 | 88.6897 | 88.7691 |
| Difference from average value of phase shifts [°] | 0.0315 | 0.0657 | 0.0452 | 0.0794 | — |
| Beam displacement [mm] | 0.033 | 0.066 | 0.331 | 0.661 | — |

It is found from the result shown in Table 5 that the smaller the space G, the smaller the beam displacement can be made.

Example 4

The transmitting phase retarding film having a phase shift of $\lambda/4(90°)$ and made up of 12 layers shown in Table 6 was designed, and a transmittance and a phase shift at the time of using the infrared laser beam with a wavelength of 10600 nm were inspected. It is to be noted that as the transmitting phase retarding film, there were designed: one (transmitting phase retarding film A) with importance attached on the accuracy of the phase shift; one (transmitting phase retarding film B) with importance attached on the height of the transmittance; and one (transmitting phase retarding film C) having both the accuracy of the phase shift and the height of the transmittance in a well-balanced manner.

Table 6 shows the configuration of the transmitting phase retarding film having a phase shift of $\lambda/4(90°)$ and made up of 12 layers, and the transmittance and the phase shift at the time of using the infrared laser beam with a wavelength of 10600 nm. It is to be noted that, in Table 6, A shows one (transmitting phase retarding film A) with importance attached on accuracy of the phase shift; B shows one (transmitting phase retarding film B) with importance attached on height of the transmittance; and C shows one (transmitting phase retarding film C) having both the accuracy of the phase shift and the height of the transmittance in a well-balanced manner.

TABLE 6

|  |  |  | A | | B | | C | |
|---|---|---|---|---|---|---|---|---|
|  |  | Constitutional material | Optical thickness [unit: $\lambda/4$] | Layer thickness [nm] | Optical thickness [unit: $\lambda/4$] | Layer thickness [nm] | Optical thickness [unit: $\lambda/4$] | Layer thickness [nm] |
| Air medium |  |  | — | — | — | — | — | — |
| Transmitting phase retarding film | First layer | Zinc selenide | 0.5589 | 616.4 | 0.5370 | 592.2 | 0.5819 | 641.7 |
| | Second layer | Thorium fluoride | 0.8194 | 1608.4 | 0.8169 | 1603.6 | 0.8123 | 1594.4 |
| | Third layer | Zinc selenide | 0.7673 | 846.2 | 0.7677 | 846.6 | 0.7584 | 836.3 |
| | Fourth layer | Thorium fluoride | 0.6744 | 1716.4 | 0.8713 | 1710.4 | 0.8715 | 1710.7 |
| | Fifth layer | Zinc selenide | 0.8123 | 895.9 | 0.8113 | 894.7 | 0.8115 | 984.9 |
| | Sixth layer | Thorium fluoride | 0.9091 | 1784.6 | 0.9054 | 1777.2 | 0.9134 | 1793.0 |
| | Seventh layer | Zinc selenide | 0.8175 | 901.5 | 0.8173 | 901.3 | 0.8174 | 901.5 |
| | Eighth layer | Thorium fluoride | 0.8829 | 1733.1 | 0.8810 | 1729.5 | 0.8825 | 1732.4 |
| | Ninth layer | Zinc selenide | 0.7717 | 851.0 | 0.7718 | 851.2 | 0.7647 | 943.3 |
| | Tenth layer | Thorium fluoride | 0.8189 | 1607.4 | 0.8135 | 1596.9 | 0.8143 | 1598.4 |
| | Eleventh layer | Zinc selenide | 0.7076 | 780.4 | 0.6952 | 766.7 | 0.7103 | 783.3 |
| | Twelfth layer | Thorium fluoride | 0.7420 | 1456.5 | 0.7106 | 1395.0 | 0.7706 | 1512.6 |

TABLE 6-continued

|  | Constitutional material | A | | B | | C | |
|---|---|---|---|---|---|---|---|
|  |  | Optical thickness [unit: λ/4] | Layer thickness [nm] | Optical thickness [unit: λ/4] | Layer thickness [nm] | Optical thickness [unit: λ/4] | Layer thickness [nm] |
| Substrate body | Zinc selenide | — | — | — | — | — | — |
| Average value of transmittance [%] |  | 96.67 |  | 98.21 |  | 97.3 |  |
| Transmittance of s-polarization component [%] |  | 95.82 |  | 97.66 |  | 97.75 |  |
| Transmittance of p-polarization component [%] |  | 97.53 |  | 98.76 |  | 96.85 |  |
| Transmissive phase retardation (°) |  | 89.74 |  | 84.7 |  | 88.7 |  |

Further, an optical component having a total phase shift of 3λ/8 can be obtained in such a manner that a substrate element having the transmitting phase retarding film shown in Table 2 and a substrate element having the transmitting phase retarding film shown in Table 6 are arranged through a space provided through a spacer and those elements are held by a holder.

REFERENCE SIGNS LIST

1: OPTICAL COMPONENT
11: SUBSTRATE BODY
11$a$: INCIDENT SURFACE
11$b$: INCLINED SURFACE
11$b$1, 11$b$2: INCLINED SURFACE
12: SUBSTRATE BODY
12$a$: EMISSIVE SURFACE
12$b$: INCLINED SURFACE
12$b$1, 12$b$2: INCLINED SURFACE
13: TRANSMITTING PHASE RETARDING FILM
14: TRANSMITTING PHASE RETARDING FILM
15: ANTIREFLECTION FILM
16: ANTIREFLECTION FILM
17: SPACER

The invention claimed is:

1. An optical component which allows infrared laser beam to be transmitted therethrough to convert a polarization of the infrared laser beam, the component comprising:
a first substrate body which is made of a platy member allowing infrared laser beam to be transmitted therethrough and having a refractive index of 2 to 4 with respect to the infrared laser beam, and which has an input surface where the infrared laser beam is incident and an inclined surface inclined at a predetermined angle of inclination to the input surface a second substrate body which is made of the platy member and which has an output surface from which the infrared laser beam is emitted and an inclined surface inclined at the predetermined angle of inclination to the output surface, and
wherein the thickness d1 of the first and second substrate bodies is calculated using their diameter D1 in accordance with Formula (2):

$$d1 = D1 \times \tan \theta(\lambda) \quad (2)$$

a transmitting phase retarding film which is formed on each of the first and second substrate bodies, and shifts a phase of the infrared laser beam; and
an antireflection film which is formed on each of the input surface and the output surface, and prevents reflection of orthogonally incident infrared laser beam,
wherein the angle of inclination is the same angle as an angle of refraction θ(λ) of the infrared laser beam in the substrate body which is calculated in accordance with Formula (1):

$$n(\lambda) \times \sin \theta(\lambda) = 1 \times \sin(x) \quad (1)$$

(where λ indicates a wavelength of the infrared laser beam, n(λ) indicates a refractive index of the platy member with respect to the infrared laser beam, and x indicates an angle of incidence of the infrared laser beam), and
wherein an arrangement is made such that the transmitting phase retarding films formed on the inclined surfaces of the respective first and second substrate bodies are opposed to each other through a space, and the input surface and the output surface are parallel to each other.

2. The optical component according to claim 1, wherein a spacer made of a heat conductive material for holding the space is provided on a peripheral edge of the inclined surface of each of the first and second substrate bodies.

3. The optical component according to claim 1, wherein the angle of incidence of the infrared laser beam is 40° to 60°.

4. The optical component according to claim 1, wherein a phase shift A by the transmitting phase retarding film formed on the inclined surface of the first substrate body and a phase shift B by the transmitting phase retarding film formed on the inclined surface of the second substrate body are each one half of a total phase shift by the optical component.

5. The optical component according to claim 1, wherein a phase shift A by the transmitting phase retarding film formed on the inclined surface of the first substrate body and a phase shift B by the transmitting phase retarding film formed on the inclined surface of the second substrate body are different from each other, and wherein a sum of the phase shift A and the phase shift B is the total phase shift by the optical component.

6. The optical component according to claim 1, wherein a pair of inclined surface, whose base angle is the angle of inclination and which forms a cross-sectionally isosceles triangular projecting shape, is periodically provided on each of the first and second substrate bodies.

* * * * *